Feb. 18, 1936.  W. I. JONES  2,031,563
FASTENER INSTALLATION AND FASTENER FOR THE SAME

Filed May 9, 1933

Inventor:
Walter I. Jones

Patented Feb. 18, 1936

2,031,563

UNITED STATES PATENT OFFICE 2,031,563

FASTENER INSTALLATION AND FASTENER FOR THE SAME

Walter I. Jones, Arlington, Mass., assignor to United-Carr Fastener Corporation, Cambridge, Mass., a corporation of Massachusetts Application May 9, 1933, Serial No. 670,134

4 Claims. (Cl. 45—138)

My invention aims to provide improvements in a snap fastener installation particularly, though not exclusively, adapted for use in connection with trimming and upholstery work.

In the drawing, which illustrates a preferred embodiment of my invention:

Figure 1:
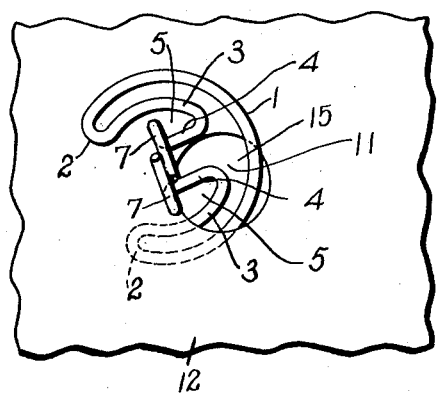
Figure 1 is a plan view of my improved stud member partially inserted by rotation into an aperture of a covering structure.
Figure 2:
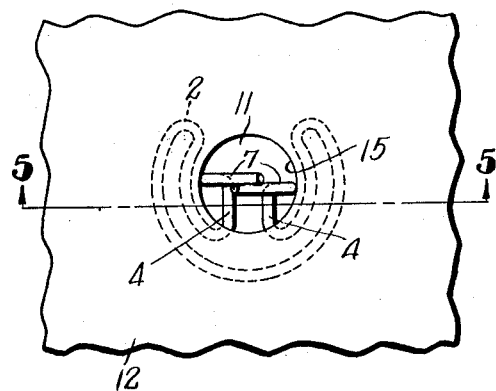
Fig. 2 is a plan view showing my improved fastener in its operative position.

Referring to the embodiment of my invention as illustrated by Figs. 1 through 5, I have shown a shiftable fastening device for detachably securing together two parts of an upholstery or like installation. Fig. 1 shows the manner in which my fastening device is inserted through a relatively small aperture of a covering structure and Fig. 2 shows the assembled fastening device located between layers of a covering structure or upholstery, the covering structure being attached to the supporting structure by the snap fastening device.

Figure 3:
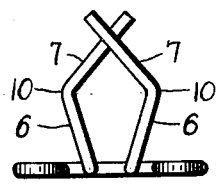
Fig. 3 is a front elevation of my improved stud member.
Figure 4:
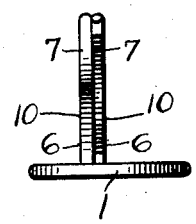
Fig. 4 is a side elevation of the stud member shown in Fig. 3.

The fastening device as illustrated is in the form of a stud and may be made from one piece of spring wire bent into a form providing a partially circular base, two torsion arms, means connecting the arms to the base and a head and neck portion extending from the arms which form the engagement means to cooperate with a fastener socket. My improved stud member is shown in Figs. 1, 3, and 4 and is formed by bending a piece of spring wire into an arc of substantially 270° forming the outer base portion 1, then bending the ends of the wire in arcs within the first-mentioned arc and in the plane thereof providing a pair of arms or return bends 2, 2 and an inner base portion 3, 3. The ends of the wire are then bent in the plane of the base 1 toward the center, forming two parallel torsion arms 4, 4. As shown by Figs. 1 and 2, notches 5, 5 are formed extending from one side of the base and continuing to a substantial distance past the center of the base between the torsion arms 4, 4 and the inner base portions 3, 3 for a purpose hereinafter described.

The head and neck portions of my improved stud member are formed by bending the remaining end portions of the wire in a plane normal to the base and bowing the said ends so that the neck portions 6, 6 diverge from the base to form the holding elements and converge to form the guiding elements or head portions 7, 7. The head and neck portions of my stud member formed by the free ends of the wire are arranged in juxtaposition and are adapted to move toward and away from each other in a scissorslike motion, while being engaged or disengaged with a cooperating fastener socket provided by the aperture 8 in the supporting structure 9. As a socket (the apertured frame 9) is brought up to the stud member for cooperating engagement, the head portions 7, 7 when touching the walls surrounding the aperture (Fig. 5) are forced toward each other, thereby decreasing the width between the shoulders 10, 10 of the stud member whereby the socket member passes over the shoulders and is held by the neck portions 6, 6 as they spring outwardly and press against the wall surrounding the aperture 8. During the engagement with a cooperating socket or the aperture 8, the movement of the head portions 7, 7 and the neck portions 6, 6 is permitted by a torsional twist of the arms 4, 4 as well as the flexibility of the inner base 3, 3, the latter portions tending to move toward each other and, when combined with the aforesaid torsional twist, decrease the width between the shoulders 10, 10 which allows engagement with the socket. During disengagement, the stud member functions in the same manner as above described.

Figure 5:
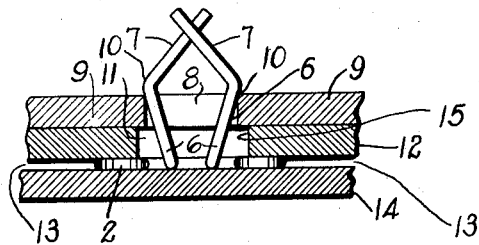
Fig. 5 is a more or less schematic sectional view on the line 5—5 of Fig. 2.

One important feature of my invention is the method of assembling my improved fastener stud between layers of upholstery or trim panelling. The layers may be composed of metal, cardboard, covering material or the like or a combination of any of these elements. In Fig. 1, I have shown the initial step in the installation of the stud member through an aperture 11 of a member 12. The arm of the return bend portion 2 of the base is inserted into the aperture 11 so that the member 12 extends well into the notch 5 and substantially past the neck portion 6 of the stud member. The stud member is then revolved about that point by twisting the head and neck portions whereby the remaining portion of the base is drawn through the aperture so that the entire base lies wholly beneath the member 12. To facilitate positioning of the stud member as shown in Fig. 5, I have provided a space 13 in the covering structure. A space in the covering structure is not necessary providing the layer 14 is flexible because the stud member may be inserted in the same manner as heretofore described as the flexibility of the layer 14 allows the necessary space for the base of the fastener member.

Heretofore, to assemble a fastener stud in somewhat the same manner as I have shown required a large aperture or an elongated slot or a combination of both, but, because of the fact that I provide a notch in the base of my stud member that extends from one side toward and a substantial distance past the neck portion, the size of the aperture has been reduced to a minimum and may be circular in shape though not necessarily so. Also because of the contour of the base of my stud fastener, it may be very easily inserted into the aperture by simple rotation and may be removed in the same manner if necessary.

Another important feature of my invention is the fact that when the fastening member is in its operative position, that is—attached with its base between the member 12 and the layer 14 and the head and neck portions extending through the aperture 11, there remains a space between the neck portion 6 of the stud member and the inner wall 15 of the aperture 11 which permits the fastener to shift laterally in all directions whereby it is automatically brought into alignment to cooperate with a fastener socket.

The fastener described in this specification provides a strong, positive in action, and cheaply manufactured wire stud member, the contour of which permits an easy adjustment with upholstery or trim panelling by use of a minimum-sized aperture, as well as permitting automatic alignment of the member with a cooperating socket.

It should be understood that my invention is not limited to the particular arrangement of the fastener member and the structure of the upholstery panels as illustrated and described herein, because the scope of my invention is best defined as set forth in the following claims.

I claim:

1. A fastener installation of the class described comprising, in combination, a supporting structure, a covering structure having means providing an aperture at one face thereof and a snap fastener member securing the covering structure to the supporting structure, said snap fastener member having a base, a head and neck extending from said base, said head and neck portions located substantially in the center of said base, the base of the fastener member having a notch extending from one side thereof toward and past and at one side outwardly of the point where the neck portion joins the base, thereby to permit attachment of the fastener member to the covering structure by insertion of the base of said member through said aperture by rotation only, said aperture being of such size and shape in relation to the size and shape of the base of said fastener member that when said fastener member is attached to said covering structure at least one portion of said base will overlap the walls surrounding said aperture during any lateral movement of said fastener member whereby said base is prevented from slipping through said aperture.

2. A fastener installation of the class described comprising, in combination, a supporting structure, a covering structure having means providing an aperture at one face thereof and a snap fastener member securing the covering structure to the supporting structure, said snap fastener member having a base, a head and neck extending from said base, said head and neck portions located substantially in the center of said base, the base of the fastener member having a notch extending from one side thereof toward and past and at one side outwardly of the point where the neck portion joins the base, thereby to permit attachment of the fastener member to the covering structure by insertion of the base of the said member through said aperture by rotation only, and said notch receiving a portion of the covering structure during the revolving movement and because of its length permitting an aperture of such size and shape in relation to the size and shape of the base of said fastener member that when said fastener member is attached to said covering structure portions of said base will overlap the walls surrounding said aperture during any lateral movement of said fastener member whereby said base is prevented from slipping through said aperture.

3. A fastener installation of the class described comprising, in combination, a supporting structure, a covering structure comprising a cardboard strip having an aperture therethrough and an outer flexible covering material attached to said cardboard strip, and a snap fastener member securing the covering structure to the supporting structure, said snap fastener member having a base positioned between said cardboard strip and said outer flexible covering material, said member having a head and neck portion extending from the center of said base and through said aperture, said neck being substantially smaller in diameter than the said aperture, thereby to permit the fastener to move laterally in all directions within the aperture, the base of said member having a notch extending from one side thereof toward and past the point where the neck portion joins the base, thereby to permit attachment of the fastener member to the covering structure by insertion of the base of the said member through said aperture by rotation only and said notch receiving the cardboard strip during the revolving movement, said aperture being of such size and shape in relation to the size and shape of the base of said fastener member that when said base is positioned between said cardboard strip and said covering material portions of said base will overlap the walls surrounding said aperture during any lateral movement of said fastener member whereby said base is prevented from slipping through said aperture.

4. A fastener installation of the class described comprising, in combination, a supporting structure, a covering structure comprising a cardboard strip having a minimum size aperture therethrough and an outer flexible covering material attached to said cardboard strip, and a snap fastener member cooperating with said covering structure and said supporting structure whereby said covering structure is secured to said supporting structure, said snap fastener having a substantially circular base positioned between said cardboard strip and said outer flexible covering material, said snap fastener having a head and neck portion extending from the center of said base and through said aperture, said neck being substantially smaller in diameter than said aperture, said aperture being no greater in diameter than one-half the diameter of said circular base of the snap fastener member, the base of said member having a notch extending from one side thereof toward and past the point where the neck portion joins the base, for the purpose described.

WALTER I. JONES.